United States Patent
Yamamoto et al.

(10) Patent No.: US 7,324,244 B2
(45) Date of Patent: Jan. 29, 2008

(54) IMAGE FORMING APPARATUS AND IMAGE FORMING METHOD

(75) Inventors: Naofumi Yamamoto, Kawasaki (JP); Haruko Kawakami, Mishima (JP); Gaku Takano, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1043 days.

(21) Appl. No.: 10/391,755

(22) Filed: Mar. 20, 2003

(65) Prior Publication Data

US 2004/0184104 A1   Sep. 23, 2004

(51) Int. Cl.
*H04N 1/40* (2006.01)
*G06F 15/00* (2006.01)

(52) U.S. Cl. .................................. 358/462; 358/1.9

(58) Field of Classification Search ................ 358/462, 358/2.1, 3.24, 3.26, 501–509, 518, 539, 426.02, 358/535–536, 505, 514, 515, 408, 496–498, 358/474, 497, 486, 401, 512–513; 382/172; 348/463, 467, 4

See application file for complete search history.

(56) References Cited

U.S. PATENT DOCUMENTS 4,926,251 A * 5/1990 Sekizawa et al. ........... 358/535
7,123,390 B2 * 10/2006 Sato ........................... 358/505
2002/0076103 A1 * 6/2002 Lin et al. .................... 382/173
2002/0094118 A1 * 7/2002 Funahashi ................... 382/130
2004/0160651 A1 * 8/2004 Hakamada .................. 358/509

FOREIGN PATENT DOCUMENTS

| JP | 61-007774 A | 1/1986 |
| JP | 61-071764 A | 4/1986 |
| JP | 64-055245 A | 3/1989 |
| JP | 2003-87556 A | 3/2003 |
| JP | 2004187119 A | * 7/2004 |

* cited by examiner

*Primary Examiner*—Douglas Q. Tran
(74) *Attorney, Agent, or Firm*—Foley & Lardner LLP

(57) ABSTRACT

An image forming apparatus includes a first-image-reading-portion composed of a plurality of line sensors used to read a color image, a second-image-reading-portion composed of at least one line sensor used to read a monochrome image, a first-image-processing-portion which processes a first-image-signal processed and outputted by the first-image-reading-portion, a second-image-processing-portion which processes a second image signal processed and outputted by the second-image-reading-portion, a segmentation portion which outputs a segmentation signal indicative of an attribute of an image in accordance with at least one of the first and second image signals, and a signal switching portion which outputs at least one of a third image signal processed and outputted by the first-image-processing-portion and a fourth image signal processed and outputted by the second-image-processing-portion based on the segmentation signal.

14 Claims, 15 Drawing Sheets

| Image zone type | Value of segmentation signal |
|---|---|
| Dot photograph | 0 |
| Sequential photograph | 1 |
| Black character | 2 |
| Color character, Yellow (Y) | 3 |
| Color character, Magenta (M) | 4 |
| Color character, Cyan (C) | 5 |
| Color character, Red (R) | 6 |
| Color character, Green (G) | 7 |
| Color character, Blue (B) | 8 |

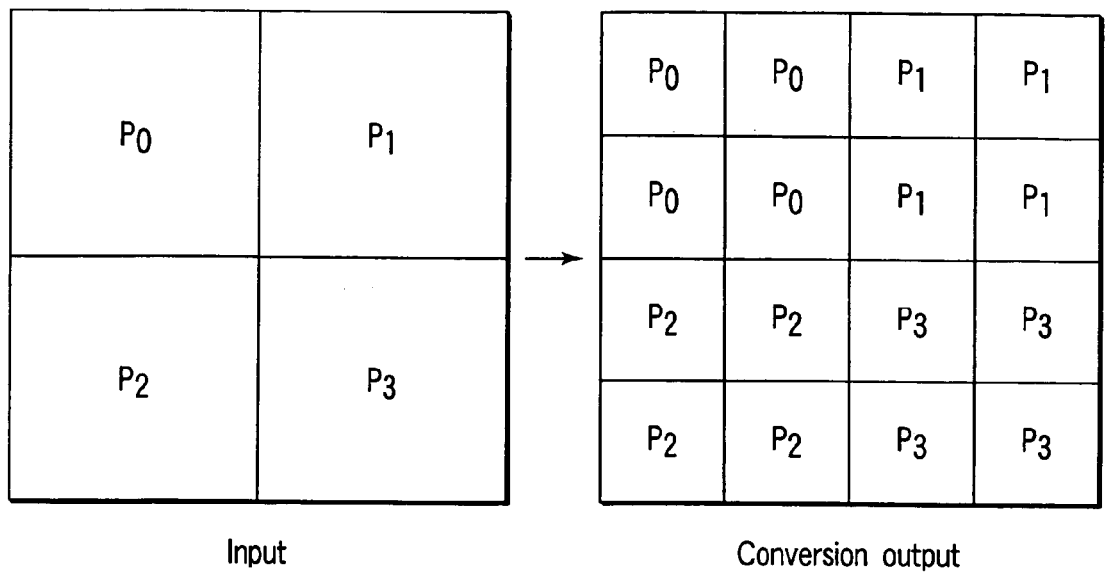
F I G. 8A
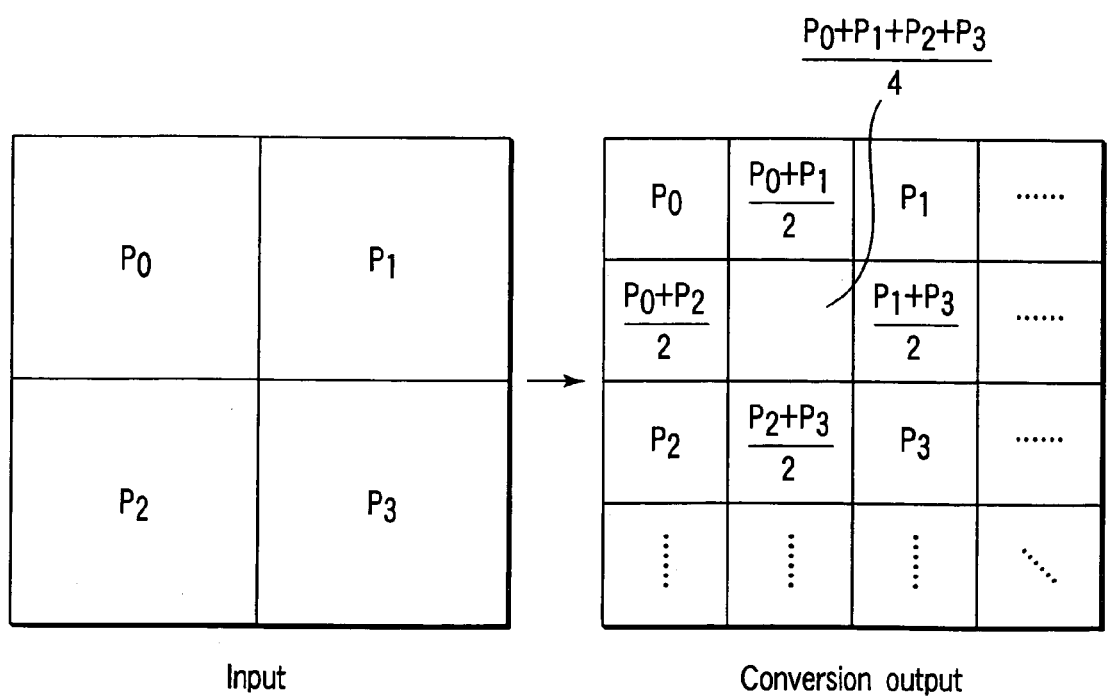
F I G. 8B

IMAGE FORMING APPARATUS AND IMAGE FORMING METHOD

BACKGROUND OF THE INVENTION

1. Field of the Invention

The present invention relates to an image forming apparatus and an image forming method, and more particularly to an image forming apparatus and an image forming method which form a color image by processing image signals read from a color document and using the processed signals.

2. Description of the Related Art

There is known an image forming apparatus, e.g., a digital color copying apparatus which reads a color image from a color document and copies the color document. In this digital color copying apparatus, a reading density of a line sensor which reads an image greatly affects the reproduced image quality. For example, in the case of reading a color image by a scanner using three color line sensors of red (R), green (G) and blue (B), a reading density of approximately 600 cpi is required in each line sensor in order to clearly reproduce a fine Ming-cho type character or prevent generation of moire in a dot document of approximately 175 cpi which is generally used for printed matter. When the reading density of the line sensor is increased in this manner, an image can be reproduced with high image quality.

On the other hand, when the reading density of the line sensor is increased, since the number of image signals or transfer speed of image signals is increased, a reference range is enlarged in signal processing to make reference to a surrounding of a target pixel, e.g., filter processing or segmentation processing, and the amount of calculation or number of delay memories is increased. Further, the reading density of the line sensor required for appropriately reproducing an image differs depending on a type of an image zone of the document to be copied.

Therefore, simply increasing the reading density increases the amount of calculation and hence leads to a reduction in copy speed, thereby increasing the cost of a circuit which executes image processing. As described above, in a color image forming apparatus, it is difficult to improve all of the image quality, the copy speed and the circuit cost when copying a document.

BRIEF SUMMARY OF THE INVENTION

By appropriately performing processing in order to reproduce an image read by lines sensors in accordance with a type of an image zone of a document to be copied, there is a need for an image forming apparatus and an image forming method which reproduce a high-quality image with a low cost.

According to an aspect of the present invention, there is provided a color image forming apparatus comprising: a first image reading portion composed of a plurality of line sensors used to read a color image; a second image reading portion composed of at least one line sensor used to read a monochrome image; a first image processing portion which processes a first image signal processed and outputted by the first image reading portion; a second image processing portion which processes a second image signal processed and outputted by the second image reading portion; a segmentation portion which outputs a segmentation signal indicative of an attribute of an image in accordance with at least one of the first image signal and the second image signal; and a signal switching portion which outputs at least one of a third image signal processed and outputted by the first image processing portion and a fourth image signal processed and outputted by the second image processing portion based on the segmentation signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8A is a view illustrating a nearest neighbor method of resolution conversion processing;

FIG. 8B is a view illustrating a linear interpolation method of the resolution conversion processing;

DETAILED DESCRIPTION OF THE INVENTION

Respective embodiments according to the present invention will now be described hereinafter with reference to the accompanying drawings. Description will be given as to a case that the present invention is applied to a digital color copying machine as one aspect of the invention.

First Embodiment

Figure 1:
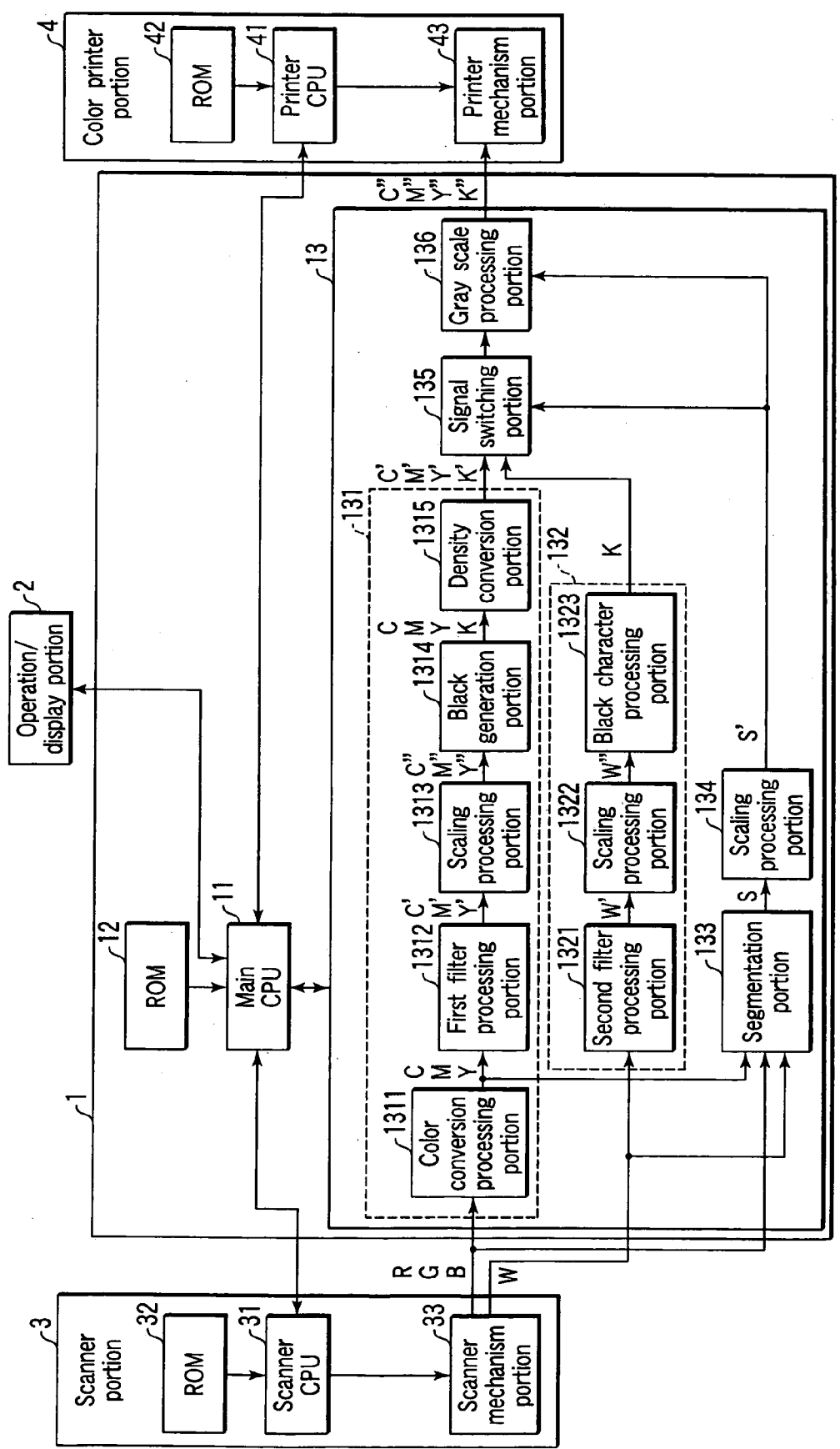
FIG. 1 is a view showing a schematic structure of an image forming apparatus according to a first embodiment.

FIG. 1 schematically shows an internal structure block of a digital copying machine. This digital color copying machine is constituted by a control portion 1, an operation/display portion 2, a scanner portion 3, a color printer portion 4 and others.

The control portion 1 is constituted by a main CPU 11, a ROM 12, an image processing portion 13, etc. The main CPU 11 controls the entire digital color copying machine. The ROM 12 stores a control program executed by the main CPU 11. The image processing portion 13 applies predetermined processing to image signals outputted from the scanner portion 3, and outputs the processed image signals to the color printer portion 4. The concrete processing of the image processing portion 13 will be described later.

The operation/display portion 2 accepts various kinds of instructions such as change of setting when copying a document from a user under control of the main CPU 11, or displays required for the user in the display portion.

The scanner portion 3 is constituted by a scanner CPU 31, a ROM 32, a scanner mechanism portion 33, etc. The scanner CPU 31 controls the entire scanner portion 3. The ROM 32 stores a control program or the like executed by the scanner CPU 31. The scanner mechanism portion 33 is constituted by an optical portion which performs reading and scanning of a document, a movement mechanism which moves the optical portion along a document base, four lines sensors to which a document image is led from the optical portion and which convert the image into image signals, an image correction portion which corrects signals respectively outputted from the line sensors.

Figures 2, 4:
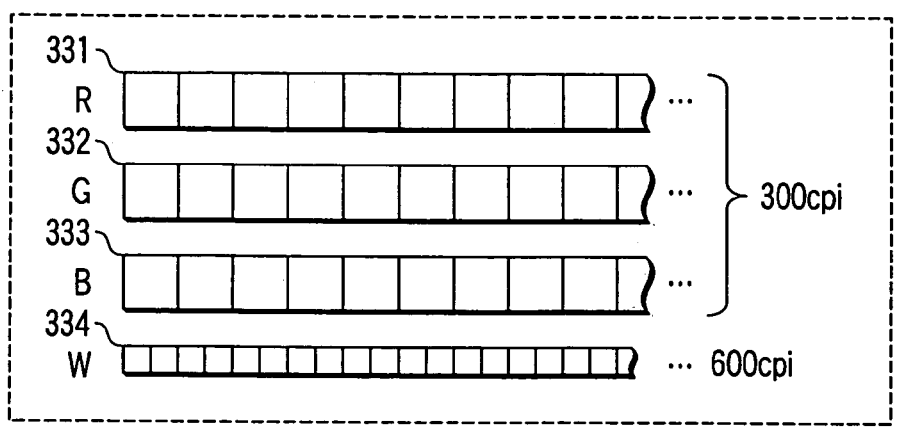
FIG. 2 is a view showing an arrangement of line sensors.
FIG. 4 is a table showing the correspondence of image zone type of an image and segmentation signals.

FIG. 2 schematically shows the arrangement of the four line sensors. The four line sensors, i.e., a line sensor 331, a line sensor 332, a line sensor 333 and a line sensor 334 are arranged in such a manner that their longitudinal directions become parallel to each other. A filter of red (R) is arranged on a light receiving surface of the line sensor 331. A filter of green (G) is arranged on a light receiving surface of the line sensor 332. A filter of blue (B) is arranged on a light receiving surface of the line sensor 333. A color filter is not arranged on a light receiving surface of the line sensor 334.

The image reading densities of the line sensor 331, the line sensor 332 and the line sensor 332 are all 300 cpi in both the main scanning direction and the sub-scanning direction, and the image reading density of the line sensor 334 is 600 cpi in both the main scanning direction and the sub-scanning direction. That is, the lines sensor 334 has a pixel pitch corresponding to approximately 600 cpi on a document surface, and each of the line sensors 331, 332 and 333 has a pixel pitch corresponding to approximately 300 cpi, which is half the pixel pitch of the line sensor 334 in both the main scanning direction and the sub-scanning direction.

It is to be noted that the sampling interval of the line sensor 334 in the sub-scanning direction is 600 cpi, whereas each of the line sensors 331, 332 and 333 has the doubled sampling interval, i.e., 300 cpi. Incidentally, in this embodiment, a signal with a high sampling density will be referred to as a "high-density" signal, and a signal with a low sampling density will be referred to as a "low-density" signal.

Therefore, a total light receiving quantity of one pixel of each of the line sensors 331, 332 and 333 is fourfold of that of the line sensor having the density of 600 cpi, thereby greatly improving the signal/noise (S/N) ratio. A loss of the light receiving quantity caused by a color filter arranged in each of the line sensors 331, 332 and 333 is generated, and the S/N ratio is reduced as compared with that of the sensor with the same reading density which does not have a color filter arranged therein. By increasing a light receiving area as described above, it is possible to obtain an S/N which is substantially equal to or above that of the sensor having no color filter arranged therein.

Furthermore, generally, in a scanner which reads a color image, read positions of the line sensors are relatively shifted due to vibrations (jitter) of the sensors generated during driving. This shifting particularly leads to occurrence of peseudo color-noise at, e.g., an edge of a black character, and deterioration of the image quantity, such as blurring, consequently occurs at an edge of a black character. In this embodiment, since increasing the read interval of each of the line sensors 331, 332 and 333 in the sub-scanning direction averages vibration components of a frequency higher than a frequency corresponding to the read interval, the jitter noise has little effect.

Figure 3:
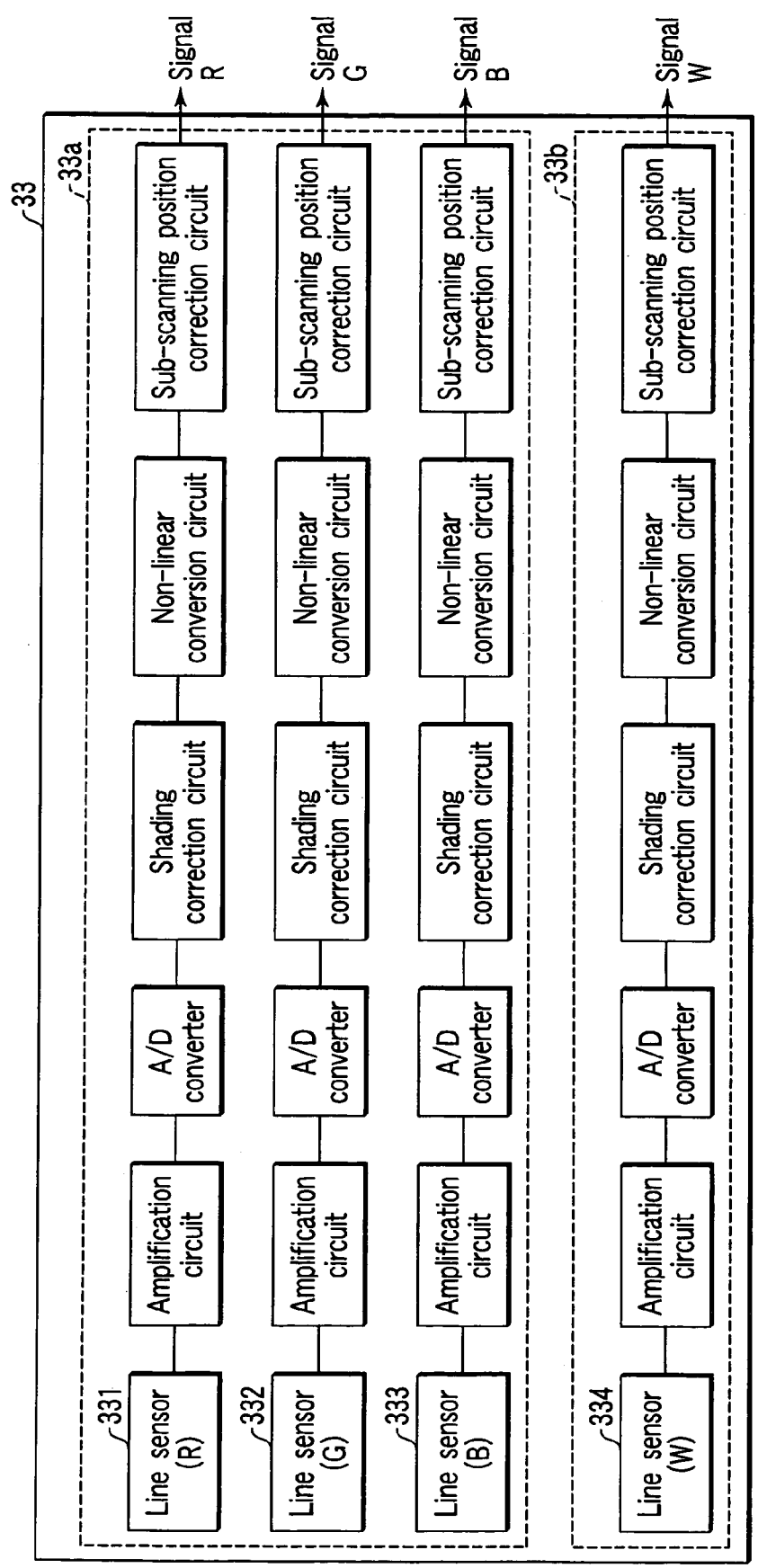
FIG. 3 is a view illustrating image signals outputted from the line sensors.

As shown in FIG. 3, signals outputted from the line sensors 331, 332, 333 and 334 are amplified in an amplifier, converted into digital signals from analog signals in an A/D conversion portion, and subjected to various kinds of correction processing in a shading correction circuit, a non-linear conversion circuit and a sub-scanning position correction circuit. Thereafter, they are outputted to the image processing portion 13 as signals RGB (first image signals) and a signal W (second image signal). It is to be noted that a first image reading portion 33a is constituted by processing a color image read by the line sensors 331, 332 and 333 and outputting the respective signals R, G and B with low density, as described above, and a second image reading portion 33b is constituted by processing a monochrome image signal read by the line sensor 334, and outputting the signal W with high density.

The shading correction portion is used to correct irregularities in the photoelectric efficiency of each light receiving element in each line sensor or irregularities in the illumination intensity of an illumination system. Irregularities in each pixel are corrected by storing signals used to read reference white and reference black with respect to all the pixels in advance and performing standardization in accordance with each pixel by using these stored values. The shading correction is disclosed in detail in, e.g., Jpn. Pat. Appln. KOKAI Publication No. S61-71764.

Furthermore, the sub-scanning position correction circuit corrects shifting of a read timing in the sub-scanning direction caused due to the arrangement of the line sensor for each color. The timing of the signal for each color is adjusted by delaying the signal of the line sensor provided ahead in the sub-scanning direction by using a delay memory or the like.

It is to be noted that the reading interval of each of the line sensors 331, 332 and 333 is 300 cpi in this embodiment but the reading interval in the sub-scanning direction may be 600 cpi which is equal to that of the line sensor 334. In this case, the signal of 300 cpi is outputted in the sub-scanning direction by performing re-sampling processing in the sub-scanning direction with respect to the output signals from the line sensors 331, 332 and 333.

The low-density signals RGB and the high-density signal W outputted from the scanner portion 3 having such a structure are inputted to the image processing portion 13.

Description will now be given as to processing of the signals in the image processing portion 13. The image processing portion 13 is constituted by a first image processing portion 131, a second image processing portion 132, a segmentation portion 133, a scaling processing portion 134, a signal switching portion 135 and a gray scale processing portion 136. The first image processing portion 131 is a processing portion to process the low-density signals RGB outputted from the scanner portion 3, and this consists of a color conversion processing portion 1311, a first filter processing portion 1312, a scaling processing portion 1313, a black generation portion 1314 and a density conversion portion 1315. The second image processing portion 132 is a processing portion to process the high-density signal W outputted from the scanner portion 3, and it consists of a second filter processing portion 1321, a scaling processing portion 1322 and a black character processing portion 1323. It is to be noted that the low-density signals RGB outputted from the scanner portion 3 are inputted to the color conversion processing portion 1311 and the segmentation portion 133, and the high-density signal W is inputted to the second filter processing portion 1321 and the segmentation portion 133. Each processing portion will now be described.

First, description will be given as to processing in the color conversion processing portion 1311. The color conversion processing portion 1311 converts the low-density signals RGB into cyan (C), magenta (M) and yellow (Y) signals. This is processing to convert color separation information of RGB into recording toner concentration information. That is, the signals CMY are signals indicative of concentrations of the recording toners. The signals RGB are converted into the signals CMY by table lookup processing or processing that linear interpolation is added to the table lookup processing. The content of the table is created by performing calculation using a Neugebauer method or a masking equation based on the color characteristic data of the scanner portion 3 or the color printer portion 4. The detail of this processing is disclosed in Jpn. Pat. Appln. KOKAI H01-055245 or S61-007774. The thus created signals CMY are inputted to the segmentation portion 133 or the first filter processing portion 1312.

The segmentation portion 133 will now be described. The signals RGB, the signals CMY and the signal W are inputted to the segmentation portion 133 as described above. The segmentation portion 133 segments an image zone of an image by making reference to these signals. Image zone types to be segmented are three types, i.e., 1. a photographic picture, 2. a black character, and 3. a color character, and color types of the color character are judged based on six types (C, M, Y, R, G and B). It is to be noted that the black character and the color character conceptually include a line as well as a character. Moreover, as to the photographic picture, a judgment is made upon whether the photographic picture is a dot picture used in printing or the like or a sequential photograph such as a silver picture. For example, the correspondence relationship between the image zone type and the signal value is set as shown in FIG. 4. That is, setting is a dot picture "0", a sequential photograph "1", a black character "2", a color character (Y) "3", a color character (M) "4", a color character (C) "5", a color character (R) "6", a color character (G) "7", and a color character (B) "8".

Figure 5:
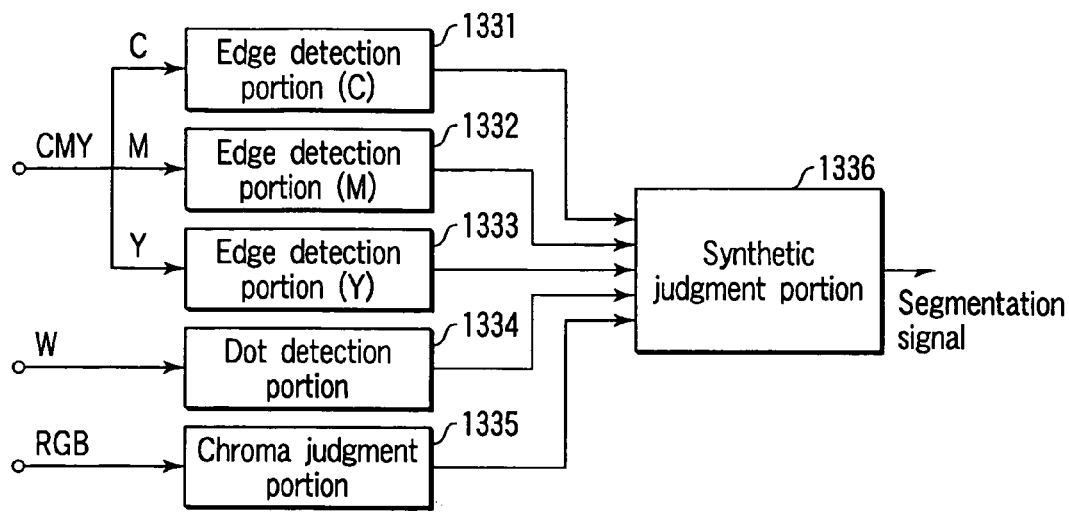
FIG. 5 is a view showing a structure of a segmentation portion.

FIG. 5 shows a structure of the segmentation portion 133. The signal C is inputted to the edge detection portion 1331, the signal M is inputted to the edge detection portion 1332, and the signal Y is inputted to the edge detection portion 1333. Then, presence/absence of the edge is detected in accordance with each color component by making reference to an area of 5×5 pixels around a target pixel for each component of the signals CMY. As the method of detecting presence/absence of the edge, there is a Block adaptive threshold (BAT) method or a line segment detection method. The dot detection portion 1334 receives the high-density signal W, checks the repeatability of shading in an area of 7×7 pixels around the target pixel, judges presence/absence of a dot component, and outputs a result. A chroma judgment portion 1335 receives the signals RGB, judges the chroma of 3×3 pixels around the target pixel, and judges whether they are colors with low chroma, e.g., white or black or whether they are chromatic colors. As to the judgment of the chroma, the chroma is judged based on the magnitude relationship between a value S and a predetermined threshold value $S_0$ by using the following expression (1).

$$S = a \cdot (R-G)^2 + b \cdot (G-B)^2 + c \cdot (R-G) \cdot (G-B) \qquad (1)$$

It is to be noted that a, b and c are constants and, for example, a=1, b=1 and c=0. A synthetic judgment portion 1336 segments an image zone based on output results from the edge detection portions 1331, 1332 and 1333, the dot detection portion 1334 and the chroma judgment portion 1335, and outputs a segmentation signal S to the scaling processing portion 134.

In addition, the image zone of the image is segmented by making reference to signals around the target pixel as described above. Generally, the segmentation accuracy is improved as the reference area is increased, but the amount of calculation and a delay memory quantity for signals are increased. For example, in order to perform segmentation from the signals RGB of 600 cpi by using the three color sensors having the reading density of 600 cpi, reference is made to approximately 5×5 pixels to 9×9 pixels as a size of the reference area. In this embodiment, since the low-density signals RGB are used, the reference area can be reduced with respect to the signals RGB, and hence the amount of calculation and a delay memory circuit scale can be decreased, thereby reducing the circuit scale.

Additionally, since the line sensors 331, 332 and 333 which perform reading with the low density of 300 cpi are used in this embodiment as described above, the color shift noise of RGB is small as compared with a case that the image is read by the color line sensors having the high density of 600 cpi. If there is the color shift noise, the values of RGB may be off-balanced and they may possibly be erroneously judged as chromatic colors even though a document is achromatic. In this embodiment, however, since the judgment accuracy can be increased, the reproducibility of black characters can be improved.

Figure 6A:
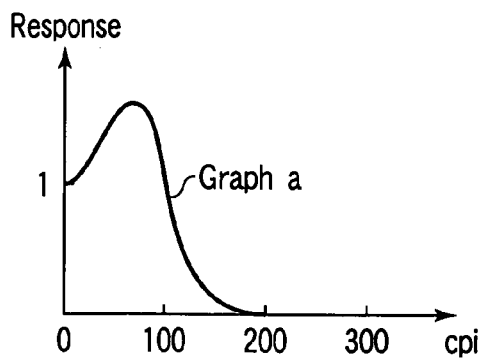
FIG. 6A is a view showing a frequency characteristic of a first filter processing portion in the first embodiment.

The first filter processing portion 1312 will now be described. The first filter processing portion 1312 applies filter processing to the signals CMY inputted thereto from the color conversion processing portion 1311, and converts these signal into signals C'M'Y'. The first filter processing portion 1312 performs elimination of a dot component in a document, emphasis on the sharpness of an edge in a picture or the like. Therefore, as shown in a graph a of FIG. 6A, a frequency characteristic is for removal of a dot component of 175 cpi used in a regular dot picture and emphasis on a component of 50 to 100 cpi which is important for the sharpness in a photographic picture.

Generally, assuming that Fs is a sampling frequency of an image signal and Fa is a minimum frequency component which takes the maximum of the frequency component, a kernel size of the filter which is not less than approximately Fs/Fa is required. In this embodiment, it is determined that the kernel size of the filter is 7×7 pixels since Fs=approximately 300 cpi and Fa=approximately 50 cpi.

Meanwhile, in a general color image, in order to reproduce a fine character in a black character area, a high-frequency component of approximately 100 to 150 cpi is important, whereas an intermediate-frequency component of approximately 50 cpi to 100 cpi is important for a photographic image or a color character. For example, when reading an image with 600 cpi by using the three color line sensors of RGB, both the frequency characteristics must be satisfied with respect to the same sampling signal. In this case, in order to realize a similar frequency characteristic, the kernel size of approximately 13×13 pixels is required, and the amount of calculation of the filter or a quantity of delay memories becomes extravagant. In this embodiment, since the kernel size can be set to a size of 7×7 pixels by using the signal having the sampling density which differs depending on whether a target area is a black character area, the amount of calculation of the filter and a quantity of delay memories can be reduced to approximately ¼ of the above, and the circuit scale can be decreased, thereby reducing the cost of the circuit. The first filter processing portion 1312 outputs the filter-processed signals C'M'Y' to the scaling processing portion 1313.

Figure 6B:
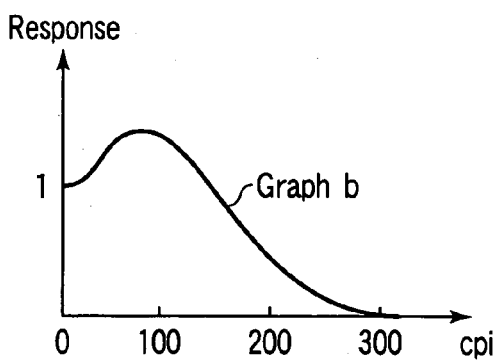
FIG. 6B is a view showing a frequency characteristic of a second filter processing portion in the first embodiment.

The second filter processing portion 1321 will now be described. The second filter processing portion 1321 applies filter processing to the high-density signal W inputted thereto from the scanner portion 3, and converts it into a signal W'. This second filter processing portion 1321 improves the sharpness of a black character. A graph b of FIG. 6B shows a frequency characteristic of this filter. An image area dealt in this filter processing is only a black character area, and removal of dots is not required. Further, since a fine black character whose size is approximately 5 points can be reproduced without being smudged, the frequency characteristic is determined to emphasize up to approximately 150 cpi. Therefore, since the flat frequency characteristic can be obtained, the size of 7×7 pixels is enough for the kernel size of the filter. The second filter processing portion 1321 outputs the filter-processed signal W' to the scaling processing portion 1322.

Description will now be given as to the scaling processing portions 134, 1313 and 1322. These scaling processing portions 134, 1313 and 1322 perform density conversion processing of each inputted signal in the main scanning direction. In this processing, when a copy magnification is set to a magnification other than 100% (equal magnification) by an instruction from the operation/display portion 2, variable magnification processing according to the set magnification is carried out. The scaling processing portion 134 outputs a segmentation signal S' subjected to the variable magnification processing to the signal switching portion 135 and the gray scale processing portion 136. The scaling processing portion 1313 outputs signals C"M"Y" subjected to the variable magnification processing to the black generation portion 1314. The scaling processing portion 1322 outputs a signal W" subjected to the variable magnification processing to a black character processing portion 1323.

Figure 7:
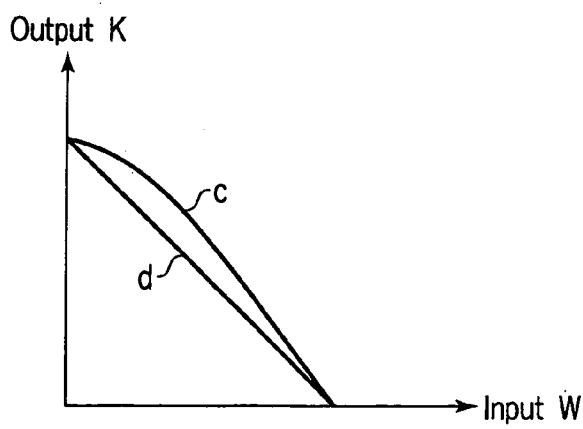
FIG. 7 is a view showing a conversion characteristic of a black character processing portion.

The black character processing portion 1323 will now be described. The black character processing portion 1323 receives the high-density signal W" outputted from the scaling processing portion 1322. The black character processing portion 1323 executes conversion processing to generate a signal K (fourth image signal) indicative of a concentration of black in a black character area from the high-density signal W". The thus converted signal K is outputted to the signal switching portion 135. In this embodiment, there is carried out conversion processing to convert the relationship of input/output signals into the signal K based on such a conversion characteristic as shown in FIG. 7. It is to be noted that, as to the conversion characteristic, although there is usually employed the relationship that the high-concentration side has a protruding shape as shown in a graph c of FIG. 7 in order to thickly represent a character, the relationship of the linear function like K=1−W may be used as shown in a graph d. It is to be noted that this conversion processing may be realized by hardware adopting a table lookup mode, or the computation expression may be realized by a combination of multiplications or additions.

The black generation portion 1314 will now be described. The black generation portion 1314 receives the low-density signals C"M"Y" outputted from the scaling processing portion 1313. The black generation portion 1314 converts the low-density signals C"M"Y" into low-density signals CMYK indicative of concentrations of four colors CMYK recorded in the color printer portion 4. Black (K) is used as well as CMK because a reduction in the total consumption of the toner in a dark part or improvement in a concentration and a gray level property of a dark part is intended. As a method of calculating the signals CMYK from the signals C"M"Y", the calculation is executed by using a computation expression such as Under Color Removal (UCR) or Gray Component Reduction (GCR). In this embodiment, GCR is used as the calculation method. The black generation portion 1314 outputs the signals CMYK to the density conversion portion 1315.

The density conversion portion 1315 will now be described. The density conversion portion 1315 performs processing to acquire signals C'M'Y'K' (third image signals) obtained by doubling the density of the low-density signals CMYK in order to match the low-density signals CMYK outputted from the black generation portion 1314 with the signal density of the signal K generated in the black character processing portion 1323. The density conversion portion 1315 outputs the thus density-converted signals C'M'Y'K' to the signal switching portion 135. As this density conversion processing method, there is used, e.g., a nearest neighbor mode or a liner interpolation mode which is a mode for performing resolution conversion. FIGS. 8A and 8B are type drawings illustrating the respective modes. The nearest neighbor mode is, as shown in FIG. 8A, a mode to enlarge the low-density signals CMYK in the vertical and horizontal direction as they are. The linear interpolation mode is, as shown in FIG. 8B, a mode to set an average value of adjacent two pixels to a signal value of an intermediate pixel by linear interpolation.

The signal switching portion 135 will now be described. As mentioned above, the signal switching portion 135 receives the segmentation signal S', the signals C'M'Y'K' and the signal K. The signal switching portion 135 switches the signals C'M'Y'K' and the signal K in accordance with the segmentation signal S' and outputs them to a gray scale processing portion 136. Here, the signal K is selected and outputted when a value of the segmentation signal is "2", i.e., it is indicative of a black character area, and the signals C'M'Y'K' are selected and outputted when the signal value is any value other than "2", i.e., it is indicative of an area other than the black character area.

The gray scale processing portion 136 will now be described. The gray scale processing portion 136 applies screen processing to the signals C'M'Y'K' outputted from the signal switching portion 135, converts them into the signals C"M"Y"K" and outputs them to the color printer portion 4. In the case of electrophotographic recording, since the concentration representation tends to be unstable when it is carried out in accordance with each pixel, the gray scale is represented by using an area modulation method in many cases. As the area modulation method, there are a mode which repeatedly uses a regular pattern and a mode which uses an irregular pattern. The mode using a regular pattern is referred to as a screen. As the screen, there are a stripe mode which is constituted by parallel lines provided at equal intervals and represents shading by a thickness of the parallel lines, a dot mode which is constituted by a two-dimensional cyclic structure of regular dots and represents shading of a size of the dots, and a mode which switches the strips and the dots in accordance with the density. Further, as the mode using an irregular pattern, there are an error diffusion mode or a blue noise mask mode. In this embodiment, the stripe mode is employed. Furthermore, since an appropriate screen differs in a character area and a photographic area, a screen for characters and that for photographs are switched in accordance with the segmentation signal S'. The screen for characters has more fine lines and a higher representation resolution than the screen for photographs, but it has a lower stability of gray scale representation.

The image processing portion 13 processes the low-density signals RGB and the high-density signal W outputted from the scanner portion 3 as described above, and outputs them to the color printer portion 4 as the signals C"M"Y"K".

The color printer portion 4 consists of a printer CPU 41, a ROM 42, and a printer mechanism portion 43. The printer CPU 41 controls the entire color printer portion 4. The ROM 42 stores a control program or the like executed by the printer CPU 41. The printer mechanism portion 43 performs printing based on an image signal for each color (Y", M", C" and K"). The printer for each color is constituted by a photoconductor drum, an electrification device which electrifies the surface of the photoconductor drum, an exposure device which has a semiconductor laser oscillator which is subjected to light emission control based on an image signal for each color (Y", M", C" and K") and forms an electrostatic latent image on the photoconductor drum, a development device which manifests the electrostatic latent image on the photoconductor drum by using a toner image, a carriage mechanism which carries paper as an image forming medium, a transfer device which transfers the toner image on the photoconductor drum onto the paper carried by the carriage mechanism, a fixing device which thermally fixes the toner image transferred onto the paper by the transfer device, etc.

The digital color copying machine uses the low-density signals RGB from the three line sensors 331, 332 and 333 of 300 cpi and the high-density signal W from the line sensor 334 of 600 dpi, and carries out signal processing corresponding to the black character area and any other area. Therefore, in hard copy performed in the color printer portion 4, since an image corresponding to each area can be reproduced with a small calculation amount, it is possible to realize high image quality, high copying speed and reduction in circuit cost.

Second Embodiment

A second embodiment will now be described. It is to be noted that like reference numerals denote parts equal to those in the first embodiment, thereby omitting the detailed explanation.

Figure 9:
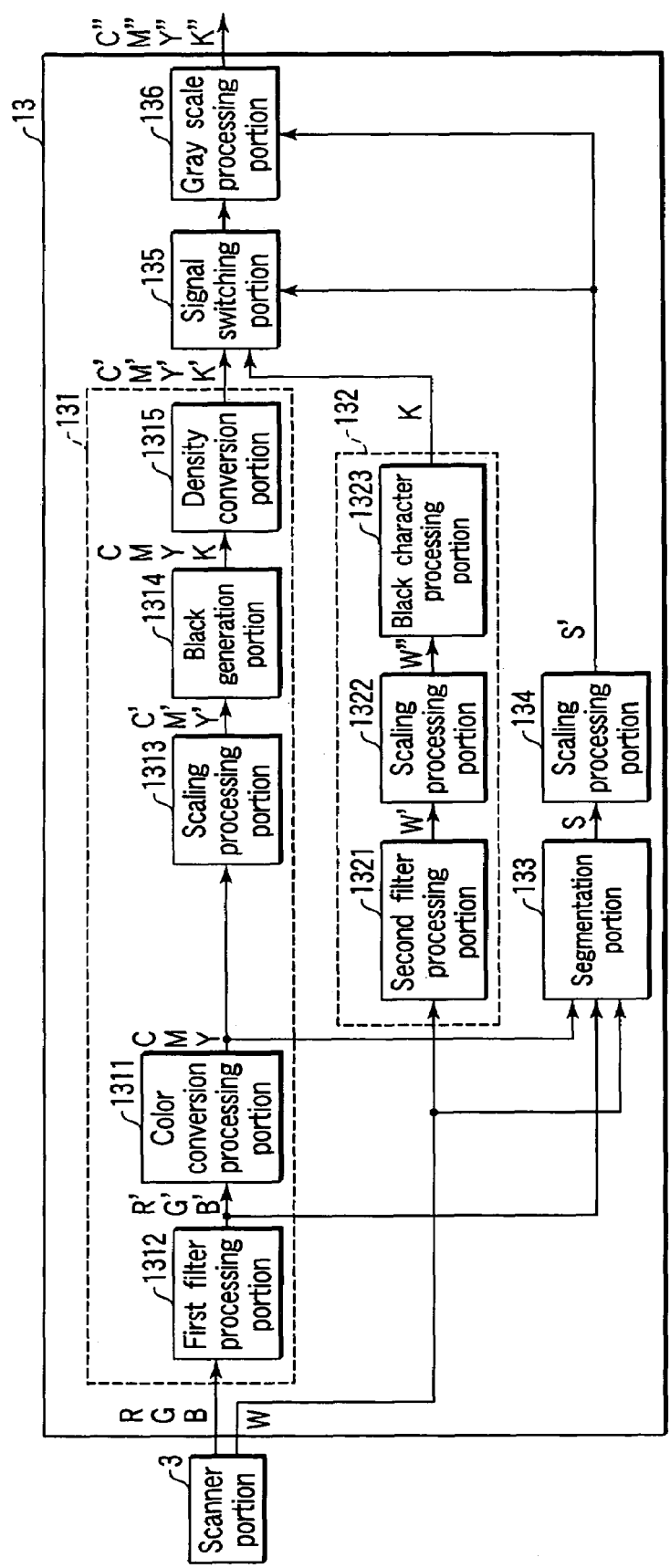
FIG. 9 is a view showing a schematic structure of an image processing portion according to a second embodiment.

A difference from the first embodiment is, as shown in FIG. 9, that the color conversion processing portion 1311 and the first filter processing portion 1312 are counterchanged in the first image processing portion 131. That is, the first filter processing portion 1312 applies the filter processing to the low-density signals RGB inputted thereto from the scanner portion 3 and obtains signals R'G'B'. The signals R'G'B are outputted to the color conversion processing portion 1311 and the segmentation portion 133. In the first image processing portion 131 according to this embodiment, a signal outputted from each processing portion is as shown in FIG. 9.

By constituting the first image processing portion 131 in this manner, a dot component in the input document can be eliminated by the filter processing before executing the color conversion processing if the document to be copied is a dot image. As a result, the color reproduction accuracy in the color conversion processing portion 1311 can be improved. When the filter processing is applied to the image signals before executing the color conversion processing, the resolution of a black character is generally lowered and the reproducibility of the black character is considerably reduced in the color conversion processing portion 1311. In this embodiment, however, as to reproduction of a black character area, the signal K generated from the high-density signal W is switched and outputted by the signal switching portion 135, thereby avoiding a reduction in the reproducibility of the black character.

Third Embodiment

A third embodiment will now be described. It is to be noted that like reference numerals denote parts equal to those in the second embodiment, thereby omitting the detailed explanation.

Figure 10:
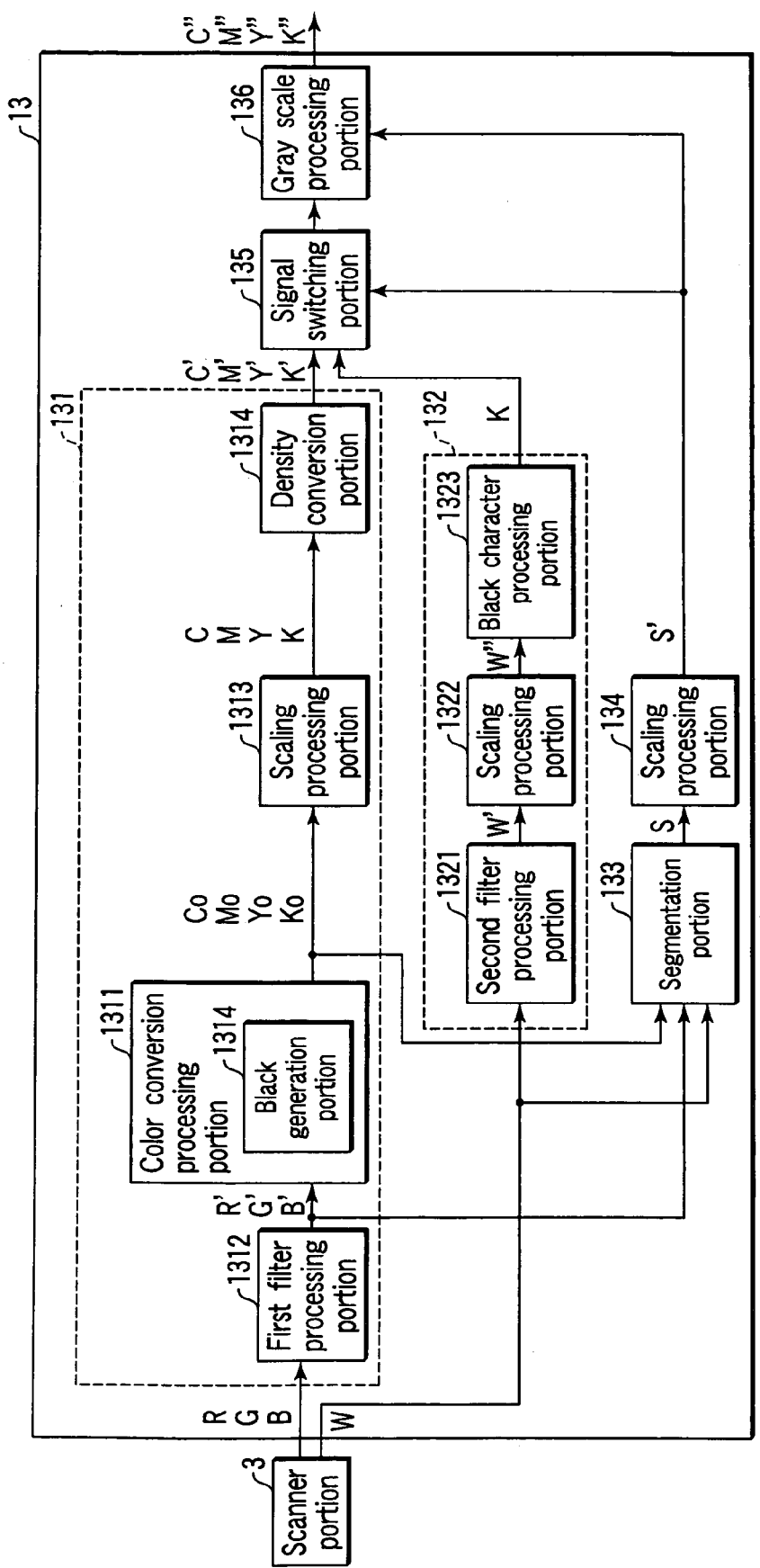
FIG. 10 is a view showing a schematic structure of an image processing portion according to a third embodiment.

A difference from the second embodiment is, as shown in FIG. 10, that a black generation portion 1314 is provided in the color conversion processing portion 1311 in the first image processing portion 131. In the first image processing portion 131 according to this embodiment, a signal outputted from each processing portion is as shown in FIG. 10.

The color conversion processing portion 1311 executes processing to convert the low-density signals RGB into signals CMY and processing to convert the signals into signals CMYK. Therefore, signals $C_0M_0Y_0K_0$, obtained by processing the signals R'G'B' in the color conversion processing portion 1311, are outputted to the scaling processing portion 1322. By constituting the first image processing portion 131 in this manner, the circuit scale of the first image processing portion 131 can be reduced.

Fourth Embodiment

A fourth embodiment will now be described. It is to be noted that like reference numerals denote parts equal to those in the first embodiment, thereby omitting the detailed explanation.

Figure 11:
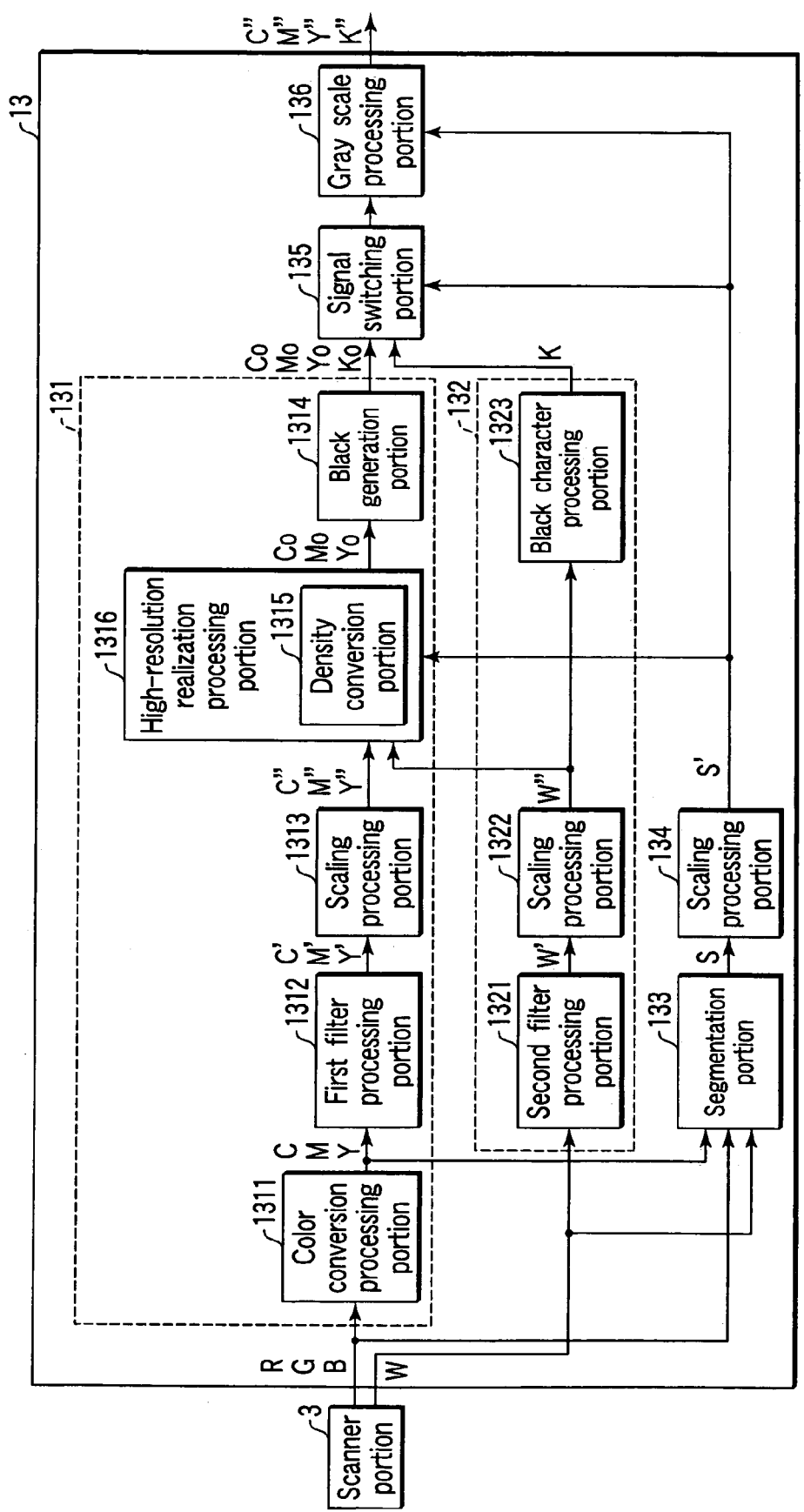
FIG. 11 is a view showing a schematic structure of an image processing portion according to a fourth embodiment.

A difference from the first embodiment is, as shown in FIG. 11, that a high-resolution realization processing portion 1316 is newly provided between the scaling processing portion 1313 and the black generation portion 1314 in the first image processing portion 131, and a density conversion portion 1315 is provided to the high-resolution realization processing portion 1316. In the first image processing portion 131 according to this embodiment, a signal outputted from each processing portion is as shown in FIG. 11. To the high-resolution realization processing portion 1316 are inputted signals C"M"Y" which are subjected to the color conversion processing (conversion into the signals CMY) and the first filter processing (conversion into the signals C'M'Y') and then outputted from the scaling processing portion 1313. Besides these signals, the high-resolution realization processing portion 1316 receives a high-density signal W" outputted from the scaling processing portion 1322 and a segmentation signal S' outputted from the scaling processing portion 134.

The high-resolution realization processing portion 1316 will now be described. The high-resolution realization portion 1316 carries out processing to convert the density of the low-density signals C"M"Y" into double density, i.e., 600 dpi based on the low-density signals C"M"Y", the high-density signal W" and the segmentation signal S' and adds a high range component of the high-density signal W". As a result, the resolution of the low-density signals C"M"Y" can be improved.

Figure 12:
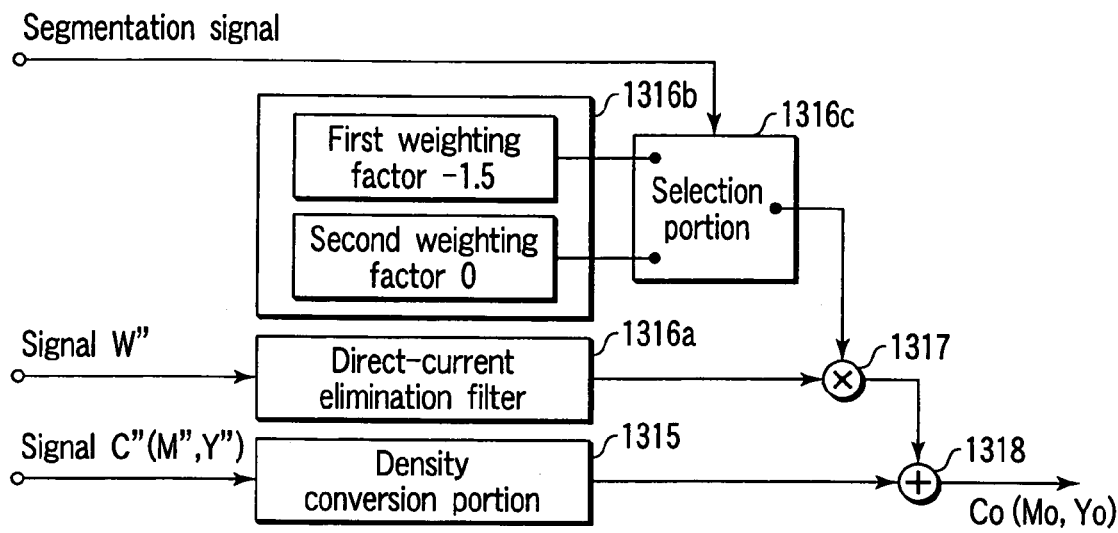
FIG. 12 is a view showing a structure of a high-resolution realization processing portion.

FIG. 12 shows a structure of the high-resolution realization processing portion 1316. First, the density conversion portion 1315 converts the low-density signal C" into the high-density signal C. Although the nearest neighbor method is used in this embodiment, the linear interpolation method or the like may be utilized like the density conversion in the first embodiment. On the other hand, a direct-current elimination filter 1316a is applied to the high-density signal W". This calculates an average value in a block in units of a block of 2×2 pixels, subtracts the average value from each pixel value, and creates a signal. As a result, a direct-current component in the signal is eliminated, and the signal having only an alternating-current component (changed component) is outputted. It is to be noted that only the average value in the block of 2×2 pixels is used in this embodiment, but data of a neighboring block other that this block may be employed. A weighting factor 1316b is selected by a selection portion 1316c, and the output signal is multiplied by this factor by a multiplier 1317. Thereafter, a result is added to the signal C which has been converted into a high-density signal by an adder 1318, and a high-resolution realization signal $C_0$ is outputted.

The weighting factor controls the intensity of the high-resolution realization processing, and the selection portion 1316c switches a plurality of weighting factor groups based on the segmentation signal S'. As shown in FIG. 12, a plurality of the weighting factor groups consists of, e.g., a first weighting factor "−1.5" and a second weighting factor "0", and the selection portion 1316c switches and uses the first weighting factor "−1.5" in a character area and the second weighting factor "0" in a photographic area.

Although the high-resolution realization processing realizes the high resolution by utilizing the correlation between the low-density signals C"M"Y" and the high-density signal W", the correlation is generally high in the character area whilst the correlation is low in the photographic area. Therefore, when the high weighting factor is used in the photographic area, excessive correction is performed, and an ill effect such as overshoot may possibly occur, in particular, in edge portions having different hues. In this embodiment, the selection portion 1316c switches the weighting factor by using the segmentation signal, and determines the weighting factor in the photographic area as the second weighting factor "0", thereby avoiding the above-described ill effect. Further, generally, since the high-density signal W and the low-density signals CMY have opposite polarities (a signal value of the signal W becomes larger as the brightness is higher, and a signal value of the signals CMY becomes smaller as the brightness is higher), the first weighting factor in the character area is determined to be a negative value. It is to be noted that processing to the component in the signal C" has been described in this drawing, but the similar processing is applied to the signal M" and the signal Y". At this moment, as the weighting factor, a value appropriate for each color component is used.

Figure 13:
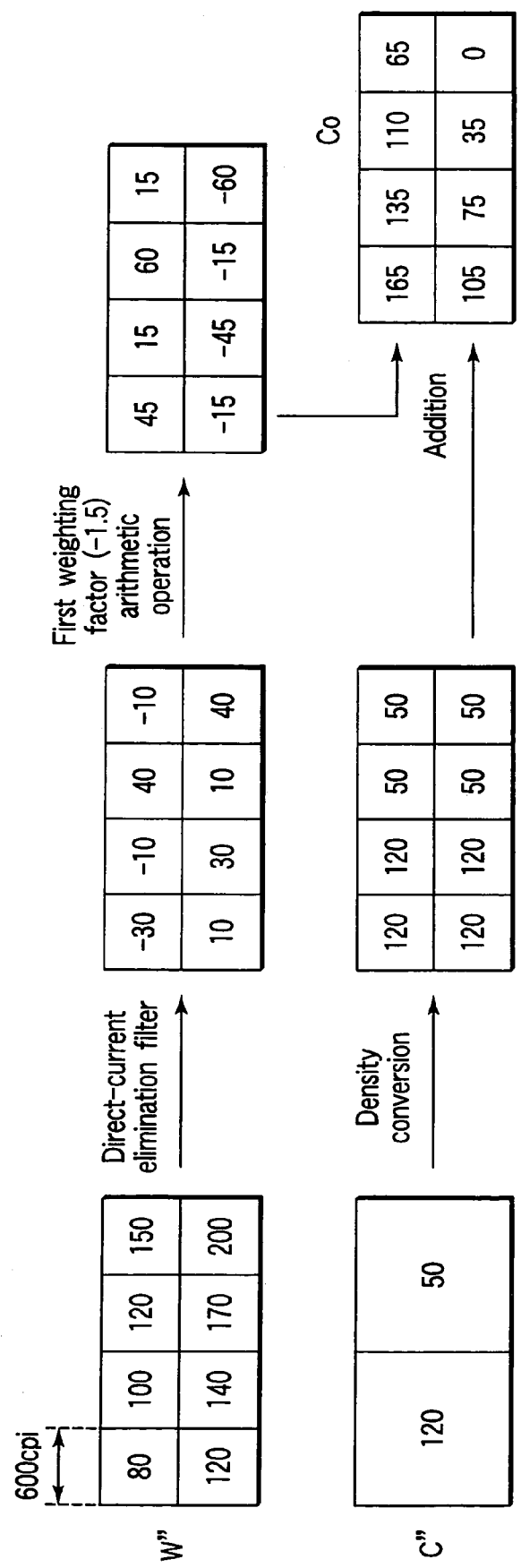
FIG. 13 is a view showing an example of high-resolution realization processing.

Description will now be given as to concrete processing to realize the high resolution by using the low-density signal C" and the high density signal W". FIG. 13 shows an example of this high-resolution realization processing. Here, it is assumed that all areas are character areas and the first weighting factor "−1.5" is used as the weighting factor. By adding the high range component of the high-density signal W" to the low-density signal C", the high-resolution realization signal $C_0$ has a concentration distribution which is more gentle as compared with a signal subjected to only the density conversion processing. Since a color character is created from the low-density signals RGB in the first embodiment, a deterioration such as a blot or jaggy is generated in a small color character or the like even though its amount is small. Such a phenomenon occurs in a character constituted by a thin line such as a small character or a Mincho-type character. In this embodiment, by using the spatial correlation between the signals C"M"Y" and the signal W" to the high-resolution realization processing, the jaggy or blot in a color character or a color line part on a white background is improved. It is to be noted that the processing to the component of the low-density signal C" has been described but the similar processing is also applied to the signal M" and the signal Y" by using the weighting factor set for each of these signals.

As described above, by mixing the component of the high-density signal W" in the high-resolution realization processing portion 1316, the resolution of the low-density signals C"M"Y" is increased, and these signals are converted into the signals $C_0 M_0 Y_0$ and outputted to the black generation portion 1314. The black generation portion 1314 applies the black generation to the signals $C_0 M_0 Y_0$, and converts these signals into the signals $C_0 M_0 Y_0 K_0$ (fifth image signals), and outputs them to the signal switching portion 135. As a result, the resolution of a color character on the white background can be improved in particular. Furthermore, in this embodiment, an advantages similar to those in the first embodiment can be obtained.

Fifth Embodiment

A fifth embodiment will now be described. It is to be noted that like reference numerals denote parts equal to those in the fourth embodiment, thereby omitting the detailed explanation.

Figure 14:
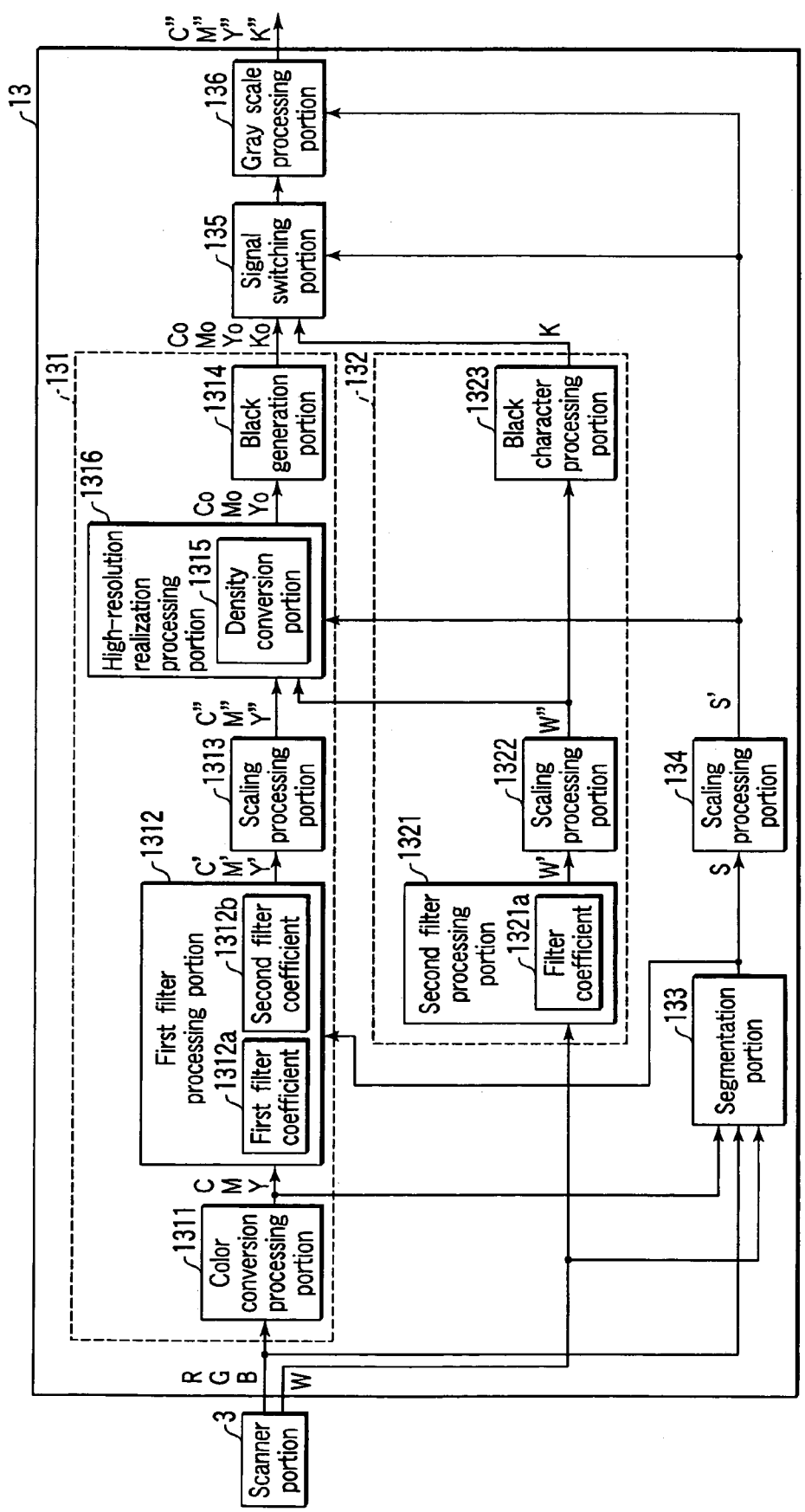
FIG. 14 is a view showing a schematic structure of an image processing portion according to a fifth embodiment.

A difference from the fourth embodiment is, as shown in FIG. 14, that the segmentation signal S' outputted from the segmentation portion 133 is inputted to the first filter processing portion 1312. Moreover, the first filter processing portion 1312 stores a first filter coefficient 1312*a* and a second filter coefficient 1312*b* used to execute the filter processing.

Figure 15A:
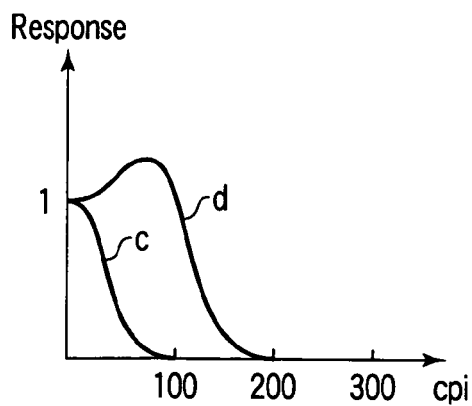
FIG. 15A is a view showing a frequency characteristic of a first filter processing portion in the fifth embodiment.
Figure 15B:
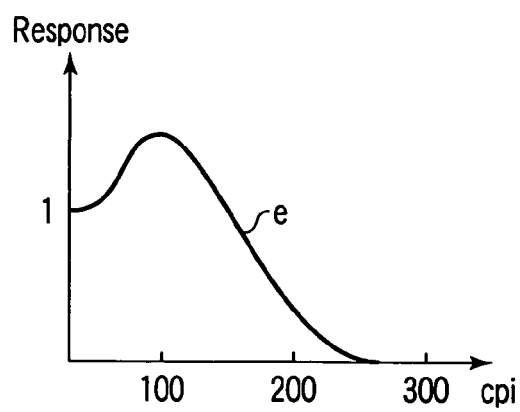
FIG. 15B is a view showing a frequency characteristic of a second filter processing portion in the fifth embodiment.

The first filter processing portion 1312 switches the first filter coefficient 1312*a* and the second filter coefficient 1312*b* in accordance with the segmentation signal S' outputted from the segmentation portion 133. The first filter processing portion 1312 applies the filter processing to the low-density signals CMY based on the switched filter coefficient. For example, the first filter processing portion 1312 uses the first filter coefficient 1312*a* when the segmentation signal is "0", i.e., in an area segmented as a dot area, and uses the second filter coefficient 1312*b* in any other area. FIG. 15A shows a frequency characteristic of the first filter coefficient 1312*a* by a graph c, and a frequency characteristic of the second filter coefficient 1312*b* by a graph d. The first filter coefficient 1312*a* is a smoothing filter having an extremely low cutoff frequency. Furthermore, FIG. 15B shows a frequency characteristic of a filter coefficient 1321*a* of a second filter processing portion 1321 by a graph e, this frequency characteristic emphasizes a frequency of 100 to 150 cpi in order to increase the sharpness of a black character, like the first embodiment.

Figure 16:
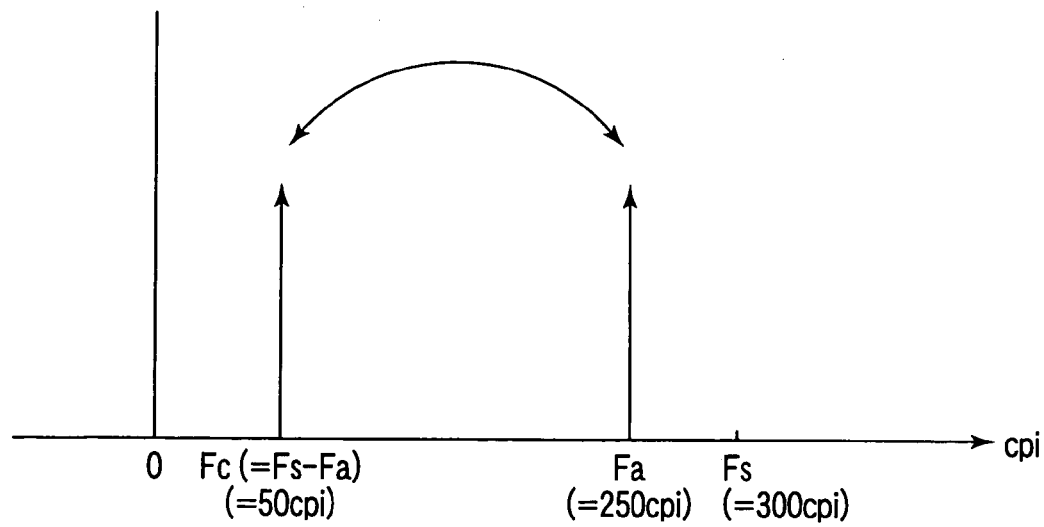
FIG. 16 is a view illustrating a factor of occurrence of moire.

By applying the smoothing filter having an extremely low cutoff frequency in a dot area as described above, the first filter processing portion 1312 avoids occurrence of the moire noise. Generally, assuming that Fa is a frequency of a dot on a document and Fs is a sampling frequency of a line sensor used to read an image, a component Fc=Fs−Fa as well as the frequency Fa is generated in the read digital signal by aliasing as shown in FIG. 16. Since the intensity of the frequency Fc component is decreased as a value of Fc becomes smaller, no problem occurs in case of Fc=0, but both the intensity and the frequency can be visually recognized when Fc=approximately 20 cpi to 70 cpi. For example, in this embodiment, each of the line sensors 331, 332 and 333 has the sampling frequency Fs=300 dpi, but Fc=50 cpi is achieved in case of dots that the reading cycle in the main scanning direction is 250 cpi (e.g., dots that the density is 175 cpi and a screen angle is 45 degrees), and the moire may possibly be generated. In this embodiment, occurrence of the moire noise can be suppressed by eliminating the frequency component in this band by using the smoothing filter in the first filter processing portion 1312.

In this embodiment, by applying the smoothing filter with the low cutoff frequency in the first filter processing portion 1312, a turnback component of the sampling frequency of the dot component of a document can be reduced. As a result, the moire noise can be suppressed. Moreover, such image signal processing can restrain generation of the moire noise with respect to a dot document having an arbitrary number of lines. Therefore, the digital color copying machine can perform copying which hardly generates the moire. In addition, this embodiment can obtain advantages similar to those in the first embodiment.

Sixth Embodiment

A sixth embodiment will now be described. It is to be noted that like reference numerals denote parts equal to those in the first embodiment, thereby omitting the detailed explanation.

Figure 17:
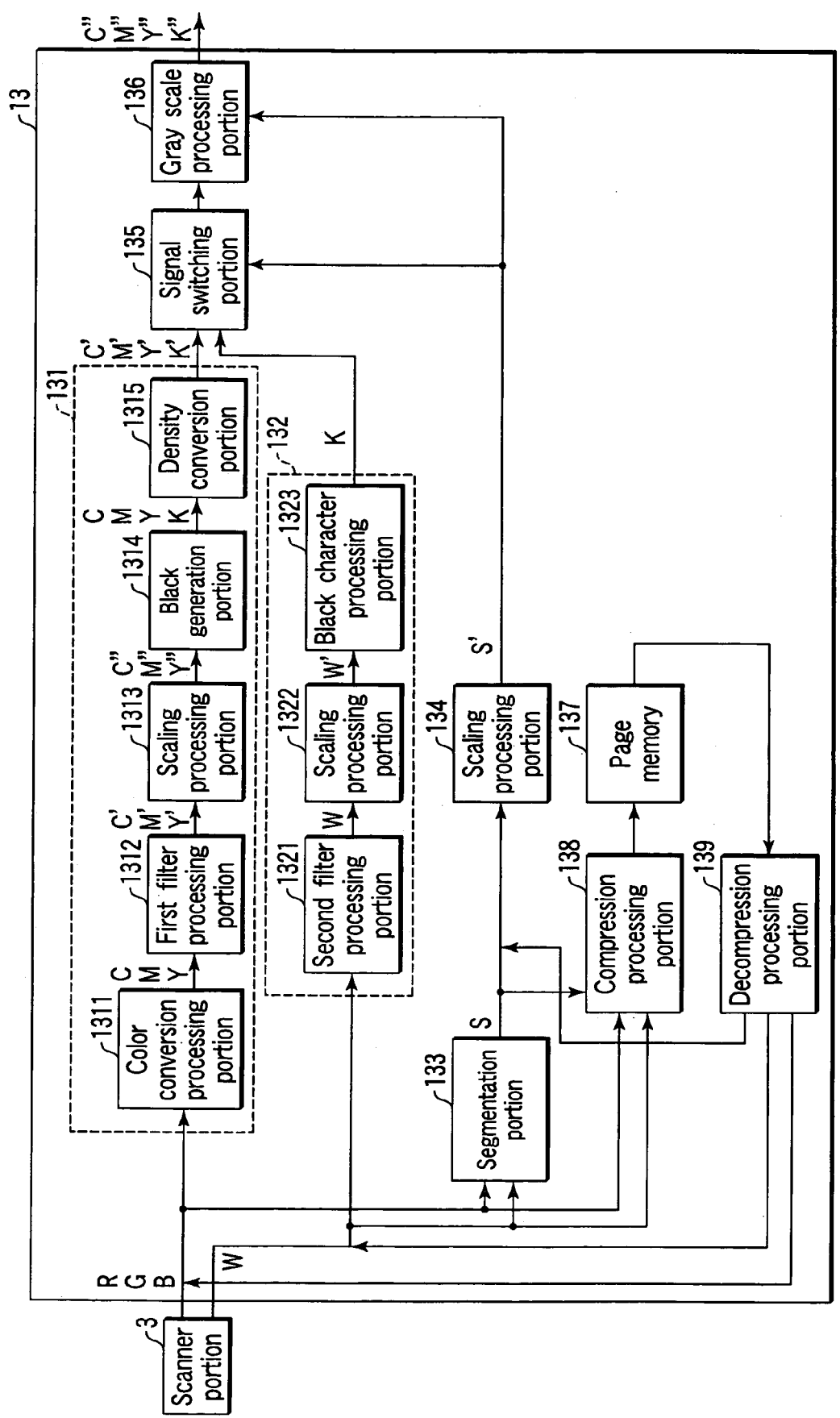
FIG. 17 is a view showing a schematic structure of an image processing portion according to a sixth embodiment.
Figure 19:
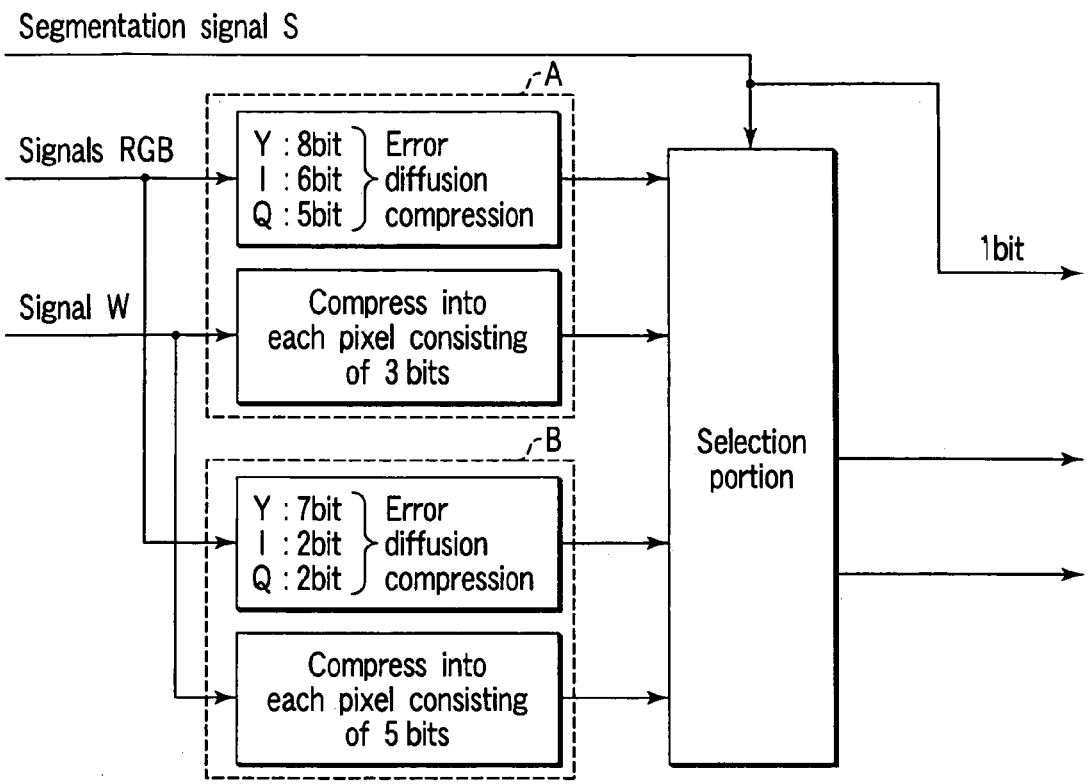
FIG. 19 is a view showing another example of compression processing of image signals.

A difference from the first embodiment is, as shown in FIG. 17, that a page memory 137 as a storage portion used to store an image, a compression processing portion 138 and a decompression processing portion 139 are provided. The compression processing portion 138 reduces an amount of image signals stored in the page memory 137 by compressing the image signals stored in the page memory. The decompression processing portion 139 executes the processing to decompress the compressed image signals. Additionally, the scanner portion 3 outputs the low-density signals RGB and the high-density signal W to the segmentation portion 133 and the compression processing portion 138, respectively. The segmentation portion 133 outputs the segmentation signal S to the compression processing portion 138. The compression processing portion 138 stores therein, as compression information, a processing method to perform the later-described compression processing based on the segmentation signal, and outputs a signal compressed based on this to the page memory 137. The page memory 137 outputs the stored compressed signal to the decompression processing portion 139. The decompression processing portion 139 applies the decompression processing to the signals, and then outputs the signals RGB to the color conversion processing portion 1311, the signal W to the second filter processing portion 1321 and the segmentation signal S to the scaling processing portion 134, respectively.

Figure 18:
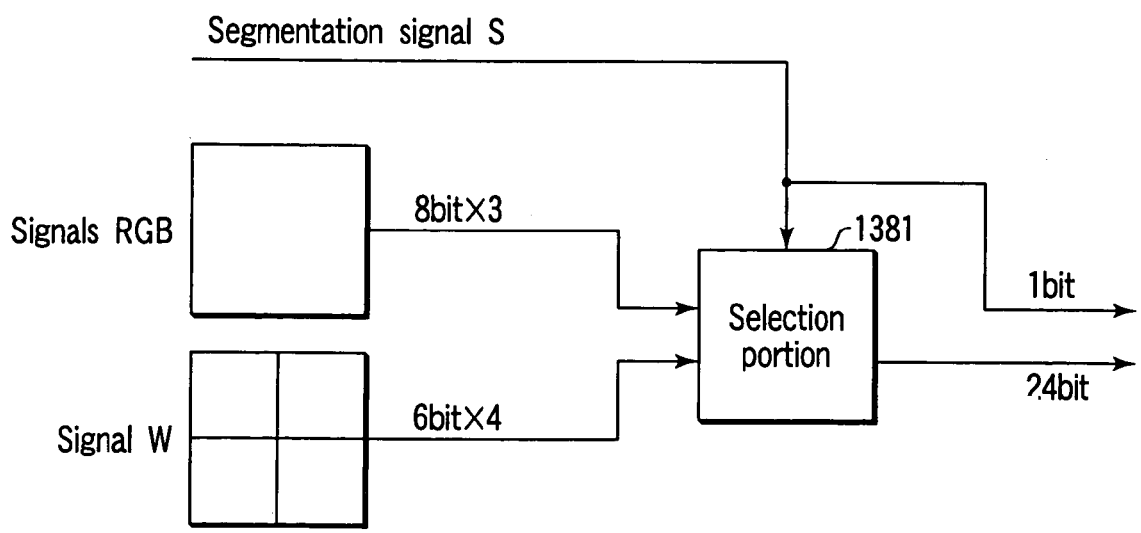
FIG. 18 is a view showing an example of compression processing of image signals.

The compression processing portion 138 will now be described. FIG. 18 shows an example of the compression processing. The inputted high-density signal W is compressed for each pixel consisting of six bits and inputted to the selection portion 1381. This compression method may be a method to simply round down the inferior two bits of the image signal consisting of eight bits, or an error diffusion method which diffuses the round-down error to surrounding pixels. Further, the inputted low-density signals RGB are inputted to the selection portion 1381 as they are. Then, the selection portion 1381 makes reference to the segmentation signal S in units of a block consisting of 2×2 pixels, and outputs the signal W for four pixels in the case of a black character area and outputs the low-density signals RGB in the case of any other area. Furthermore, it also outputs a one-bit signal indicative of a selected area. As a result, there is carried out compression processing by which the signals RGB or the signal W can have a signal amount of 25 bits in units of block consisting of 2×2 pixels in accordance with an area, and a total of 56 bits of the block consisting of 2×2 pixels before compression can be greatly eliminated.

Another example of the compression processing will now be described. In this example, two types of signal processing, A and B, described below, are carried out, and the selection portion 1382 switches an output in accordance with the segmentation signal S. The signal compression processing A converts the signals RGB into signals YIQ (YIQ correspond to color spaces), then applies the error diffusion compression to the converted signals in order to obtain Y: eight bits, I: six bits and Q: five bits, and executes the processing to compress the signal W into each pixel consisting of three bits. That is, since the compression ratio of the signals RGB is low, the reproducibility of the signals RGB is higher than that of the signal W when these signals are decompressed and represented. The signal compression processing B converts the signals RGB into signals YIQ, then applies the error diffusion compression in order to obtain Y: seven bits, I: two bits and Q: two bits, and carries out processing to compress the signal W to each pixel consisting of five bits. That is, since the compression ratio of the signal W is low, the reproducibility of the signal W becomes higher than that of the signals RGB when this signal is decompressed and represented. For example, if the segmentation signal S is indicative of an area other than a black character area, the signal compressed by the signal compression processing A is switched and outputted. Also, if the segmentation signal S is indicative of a black character area, the signal compressed by the signal compression processing B is switched and outputted. The both types of the signal compression processing A and B can execute encoding of 31 bits in units of 2×2 block. It is possible to add the one-bit signal indicative of the selected processing to the 31 bits, and compress the output signal to a signal amount of 32 bits.

In the former signal compression example, only the signal W or the signals RGB is encoded in accordance with an image zone, but both signals are encoded according to this compression processing. Therefore, it is possible to provide a high-resolution realization processing 1316, like the fourth embodiment, for example.

In this embodiment, a reduction in the image quality can be suppressed and the image can be compressed with a high compression ratio by changing a weight of compression of the signal W and the signals RGB in the compression processing portion 138 in accordance with the segmentation signal S, thereby decreasing a capacity of the page memory. Therefore, the circuit cost can be greatly reduced. Moreover, this embodiment can obtain the same advantages as those in the first embodiment.

Seventh Embodiment

A seventh embodiment will now be described. This embodiment realizes the processing in the image processing portion 13 in the foregoing embodiments by software. Incidentally, in regard to the details of the processing, the processing described in the foregoing embodiments is executed by software, thereby omitting the explanation.

Figure 20:
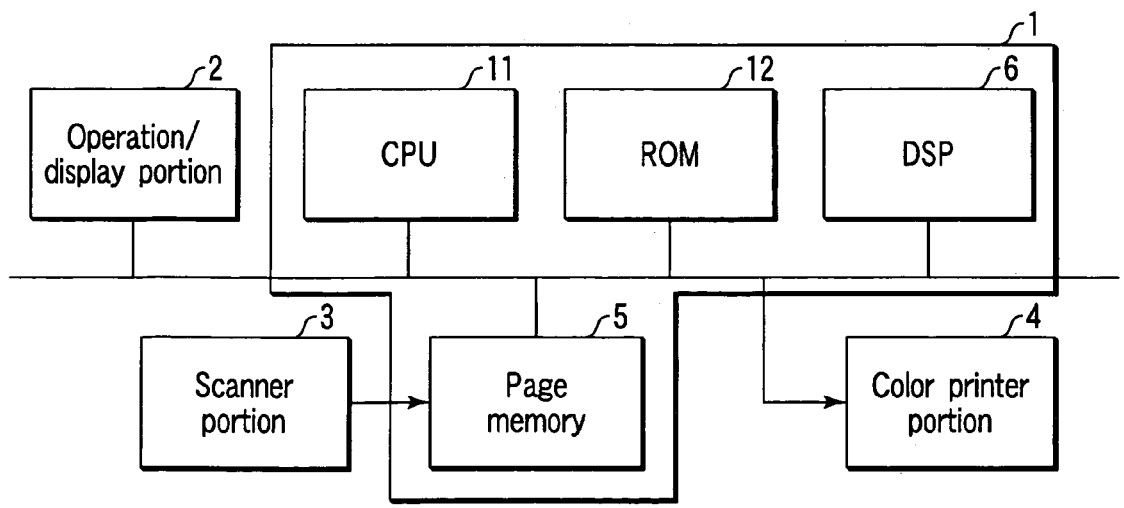
FIG. 20 is a view showing a schematic structure of a color image forming apparatus according to a seventh embodiment.

As shown in FIG. 20, the structure of the control portion 1 in this embodiment is different from that in each of the above embodiments. That is, the low-density signals RGB and the high-density signal W inputted from the scanner portion 3 are stored in the page memory 5, and processing of the respective signals stored in the page memory 5 is carried out in terms of software by using a control program stored in a digital signal processor (DSP) 6 under control of the main CPU 11. Specifically, the control program stored in the DSP 6 is a control program used to execute the processing carried out by the image processing portion 13 in the foregoing embodiments. The thus processed image signal is outputted to the color printer portion 4.

Figure 21:
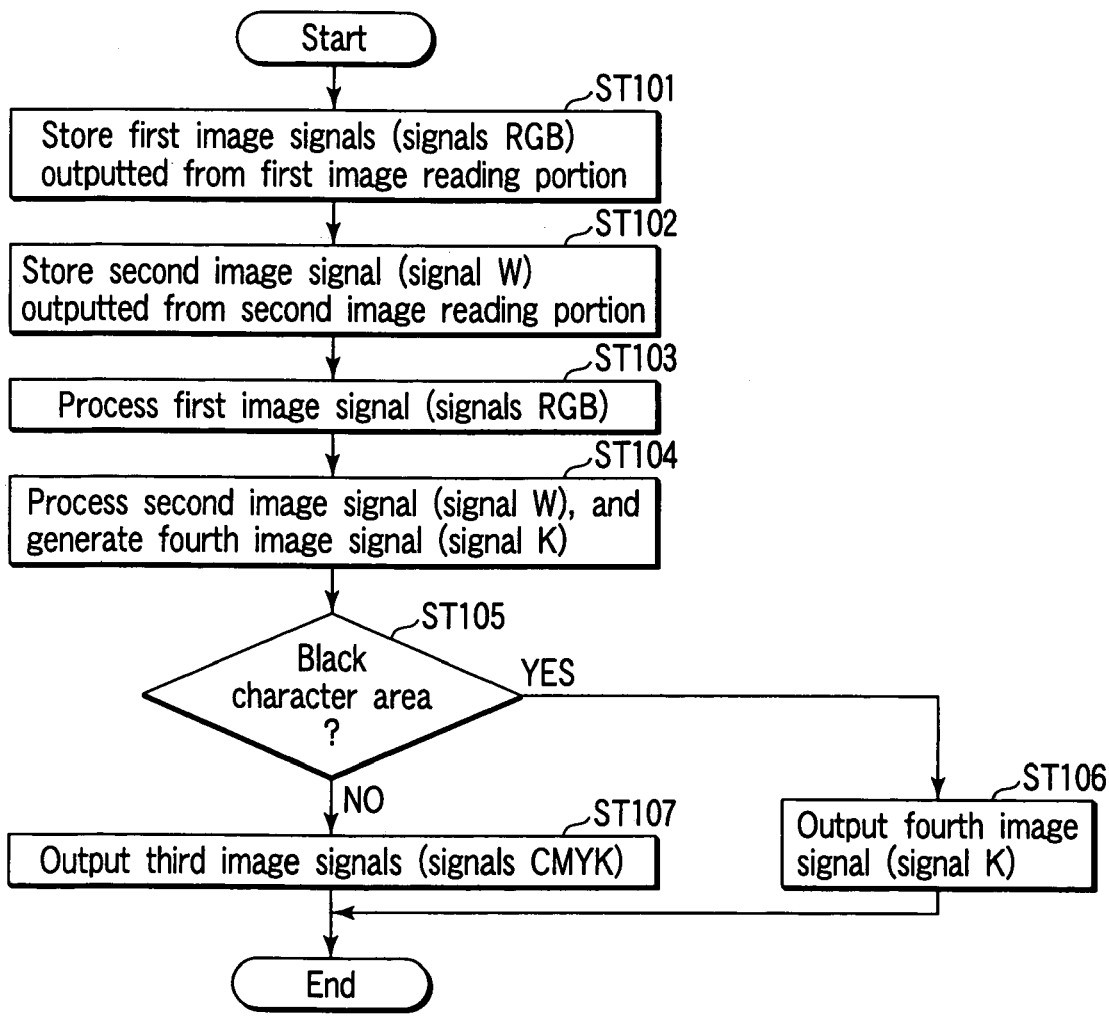
FIG. 21 is a flowchart showing a flow of image processing in the seventh embodiment.

FIG. 21 is a flowchart showing an example of processing executed by the main CPU 11. The processing illustrated in this flowchart corresponds to the first embodiment.

At a step ST101, the main CPU 11 stores in the page memory 5 the low-density signals RGB (first image signals) subjected to reading processing in the first image reading portion. At a step ST102, the main CPU 11 stores in the page memory 5 the high-density signal W (second image signal) subjected to reading processing in the second image reading portion.

At a step ST103, the main CPU 11 applies the first filter processing, the scaling processing, the black generation and the density conversion processing to the signals RGB, and generates signals CMYK (third image signals). At a step ST104, the main CPU 11 applies the second filter processing, the scaling processing and the black character processing to the signal W, and generate a signal K (fourth image signal).

At a step ST105, the main CPU 11 segments whether a type of the image zone corresponds to a black character area or any other area than the black character area based on the signals RGB and the signal W. When the black character area is segmented, the main CPU 11 outputs the signal K at a step ST106. When any other area than the black character area is segmented, the main CPU 11 outputs the signals CMYK at a step ST107.

As described above, even if the image processing is carried out by software, the same advantages as those in the first embodiment can be demonstrated. In addition, by executing the image processing corresponding to each of the above embodiments by using software, the advantages corresponding to each of those embodiments can be likewise obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming apparatus, comprising:
a first image reading portion including a plurality of line sensors used to read a color image at a first reading density and output red, green and blue image signals having a first density;
a second image reading portion including at least one line sensor used to read a monochrome image at a second reading density higher than the first reading density and output a monochrome image signal having a second density higher than the first density;
a first image processing portion which processes the red, green and blue image signals processed and outputted by the first image reading portion, the first image processing portion including a color conversion portion which converts the red, green and blue image signals to cyan, magenta and yellow color signals representing densities of recording color toner;
a second image processing portion which processes the monochrome image signal processed and outputted by the second image reading portion;
a segmentation portion which includes an edge detection portion that detects whether an edge is present for each of color components of the cyan, magenta and yellow color signals, a dot detection portion that detects whether a dot component is present from the monochrome image signal, and a chroma judgment portion that judges chroma from the red, green and blue image signals, and which discriminates a segment based on outputs from the edge detection portion, the dot detection portion and the chroma judgment portion, and outputs a segmentation signal indicative of an attribute of an image; and
a signal switching portion which outputs at least one of a first image signal processed and outputted by the first image processing portion and a second image signal processed and outputted by the second image processing portion based on the segmentation signal.

2. The image forming apparatus according to claim 1, wherein the first image processing portion comprises at least a filter processing portion which performs filter processing on the red, green and blue image signals processed and outputted by the first image reading portion by using a preset coefficient and the color conversion portion, and the filter processing is carried out before a color conversion.

3. The image forming apparatus according to claim 2, wherein the color conversion portion comprises a black generation portion which generates a black image signal from the red, green and blue image signals subjected to the color conversion.

4. The image forming apparatus according to claim 1, further comprising a high-resolution realization processing portion which applies high-resolution realization processing to image signals based on red, green and blue image signals and the monochrome image signal, wherein the signal switching portion outputs at least one of the first image signal, the second image signal and a third image signal processed and outputted by the high-resolution realization processing portion.

5. The image forming apparatus according to claim 1, wherein the first image processing portion provides a filter processing portion which performs filter processing by using either a first filter coefficient or a second filter coefficient which are different preset coefficients, and switches the first filter coefficient and the second filter coefficient in accordance with the segmentation signal.

6. The image forming apparatus according to claim 1, further comprising:
  a compression processing portion which performs processing to compress the red, green and blue image signals and the monochrome image signal based on the segmentation signal in accordance with compression information set in conformity with the segmentation signal;
  a storage portion which stores therein the red, green and blue image signals and the monochrome image signal compressed in the compression processing portion; and
  a decompression processing portion which performs processing to decompress the red, green and blue image signals and the monochrome image signal stored in the storage portion.

7. The image forming apparatus according to claim 6, wherein the compression processing portion performs compression in such a manner that at least the reproducibility of the red, green and blue image signals becomes high when the red, green and blue image signals is subjected to decompression processing if an attribute of an image indicated by the segmentation signal is indicative of a photographic area, and that at least the reproducibility of the monochrome image signal becomes high when the monochrome image signal is subjected to decompression processing if the attribute of the image is indicative of a black character area.

8. A method used in an image forming apparatus comprising:
  reading a color image at a first reading density and output red, green and blue image signals having a first density by a plurality of line sensors;
  reading a monochrome image at a second reading density higher than the first reading density and output a monochrome image signal having a second density higher than the first density by using at least one line sensor;
  processing the red, green and blue image signals and converting the red, green and blue image signals to cyan, magenta and yellow color signals representing densities of recording color toner;
  processing the monochrome image signal;
  detecting whether an edge is present for each of color components of the cyan, magenta and yellow color signals, detecting whether a dot component is present from the monochrome image signal, judging chroma from the red, green and blue image signals, discriminating a segment based on the results of the two detecting steps and judging steps and outputting a segmentation signal indicative of an attribute of an image;
  outputting at least one of a first image signal obtained by processing the red, green and blue image signals and a second image signal obtained by processing the monochrome image signal based on the segmentation; and
  forming an image based on the outputted image signal.

9. The method according to claim 8, wherein the processing of the red, green and blue image signals is carried out by executing filter processing to subject the red, green and blue image signals to filter processing by using a preset coefficient and color conversion processing to subject the red, green and blue image signals to color conversion processing, and the filter processing is executed before the color conversion processing.

10. The method according to claim 8, wherein the color conversion processing further performs black generation to generate a black image signal.

11. The method according to claim 8, further comprising applying high-resolution realization processing to the image signals based on the red, green and blue image signals and the monochrome image signal and generating a result as a third image signal, wherein the signal outputted based on the segmentation further includes the third image signal.

12. The method according to claim 8, wherein the first image processing is performed by executing filter processing by using either a first filter coefficient or a second filter coefficient which are different preset coefficients, and the filter processing switches the first filter coefficient and the second filter coefficient in accordance with the segmentation of the attribute of the image.

13. The method according to claim 8, further comprising:
  compressing the red, green and blue image signals and the monochrome image signal based on the segmentation of the attribute of the image in accordance with compression information set in conformity with the segmentation;
  storing the compressed first image signal and second image signal; and
  applying decompression processing to the compressed first image signal and second image signal.

14. The method according to claim 13, wherein the compression processing performs compression in such a manner that at least the reproducibility of the red, green and blue image signals becomes high when the red, green and blue image signals is subjected to decompression processing if the attribute of the image indicated by the segmentation is indicative of a photographic area, and that at least the reproducibility of the monochrome image signal becomes high when the monochrome image signal is subjected to decompression processing if the attribute of the image is indicative of a black character area.

* * * * *